(12) United States Patent
Tuppen et al.

(10) Patent No.: US 8,387,853 B2
(45) Date of Patent: Mar. 5, 2013

(54) METHOD OF RESTORING A METALLIC COMPONENT

(75) Inventors: Stephen Tuppen, Swadlincote (GB); Daniel Clark, Belper (GB)

(73) Assignee: Rolls-Royce, PLC, London (GB)

( * ) Notice: Subject to any disclaimer, the term of this patent is extended or adjusted under 35 U.S.C. 154(b) by 56 days.

(21) Appl. No.: 12/969,027

(22) Filed: Dec. 15, 2010

(65) Prior Publication Data

US 2011/0180589 A1  Jul. 28, 2011

(30) Foreign Application Priority Data

Jan. 26, 2010 (GB) .................................. 1001181.5

(51) Int. Cl.
*B23K 31/00* (2006.01)
*B23K 26/00* (2006.01)

(52) U.S. Cl. .............. 228/119; 219/121.63; 219/121.64; 29/889.1; 29/889.2

(58) Field of Classification Search .................. 228/119; 29/889.1; 219/121.63, 121.64
See application file for complete search history.

(56) References Cited

U.S. PATENT DOCUMENTS

| | | | | |
|---|---|---|---|---|
| 4,547,941 A * | 10/1985 | Meier | ........................ | 29/888.021 |
| 4,730,093 A * | 3/1988 | Mehta et al. | .............. | 219/121.63 |
| 5,451,742 A * | 9/1995 | Nishio et al. | ............. | 219/121.64 |
| 6,271,499 B1 | 8/2001 | Jones et al. | | |
| 6,334,773 B1 | 1/2002 | Ahlen et al. | | |
| 6,612,480 B1 | 9/2003 | Rafferty | | |
| 7,126,076 B2 * | 10/2006 | Workman et al. | ......... | 219/117.1 |
| 2006/0131366 A1 * | 6/2006 | Schaeffer et al. | ............. | 228/226 |
| 2008/0099446 A1 | 5/2008 | Belanger | | |
| 2009/0031564 A1 * | 2/2009 | Meier | ...................... | 29/888.021 |
| 2009/0255117 A1 * | 10/2009 | Hovel et al. | .................. | 29/889.1 |

FOREIGN PATENT DOCUMENTS

| | | |
|---|---|---|
| EP | 0 401 187 A2 | 12/1990 |
| EP | 1 074 331 A1 | 2/2001 |
| EP | 1 867 423 A1 | 12/2007 |
| EP | 1 880 787 A1 | 1/2008 |
| EP | 2 088 212 A1 | 8/2009 |
| GB | 1 534 371 | 12/1978 |
| GB | 2 198 667 A | 6/1988 |
| GB | 2 227 190 A | 7/1990 |
| GB | 2 229 944 A | 10/1990 |
| JP | A-9-168927 | 6/1997 |
| JP | A-2001-207803 | 8/2001 |
| WO | WO 2009/001026 A1 | 12/2008 |
| WO | WO 2009/105221 A2 | 8/2009 |

OTHER PUBLICATIONS

European Search Report completed May 10, 2011 in European Application No. EP 10 19 5228.
British Search Report in British Application No. GB1001181.5; dated Mar. 23, 2010.
Search Report issued in British Patent Application No. GB1001181.5, mailed Nov. 9, 2011.

* cited by examiner

*Primary Examiner* — Devang R Patel
(74) *Attorney, Agent, or Firm* — Oliff & Berridge, PLC

(57) ABSTRACT

A component is repaired by removing a damaged region to form a cavity, in which layered repair inserts are installed. The profile of the cavity, and of the exposed surface of each repair insert is measured to serve as the basis for the contact surface of each subsequent repair insert. The repair inserts are fused to the wall of the cavity and to each other in a process in which heated locations of each repair insert are successively heated to minimize heat transfer within the repair inserts and in the underlying substrate material. The repair inserts may be made in a powder bed process from an alloy powder having the same composition as the material of the substrate.

13 Claims, 3 Drawing Sheets

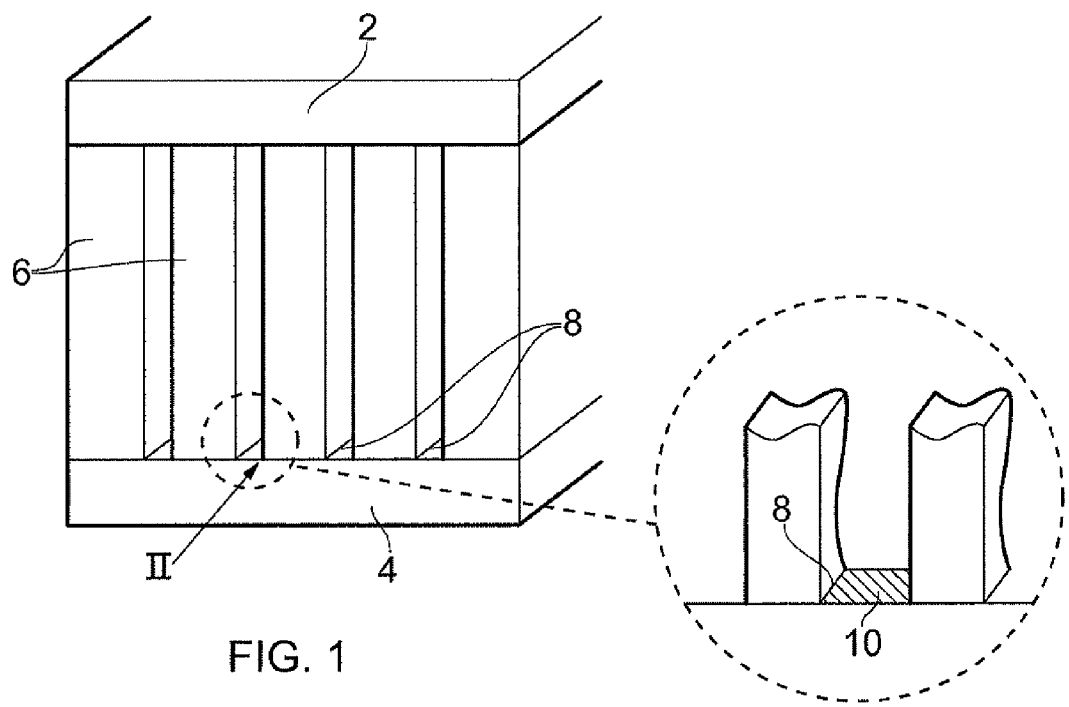
FIG. 1
FIG. 2
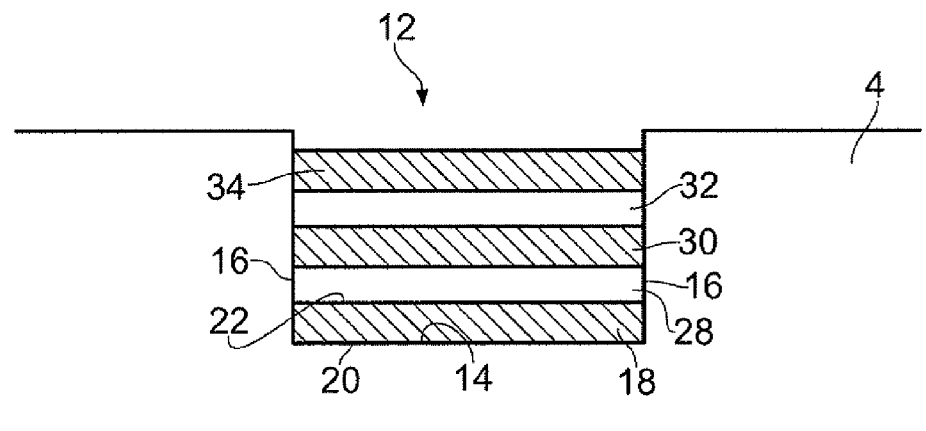
FIG. 3

METHOD OF RESTORING A METALLIC COMPONENT

This invention relates to a method of restoring a metallic component and is particularly, although not exclusively, concerned with remedial work to eliminate weld cracking in welded components.

Heat exchangers are pressure vessels that operate under complex thermal cyclic loading, often under aggressive environmental conditions. Some heat exchangers, for example those used on offshore oil and gas rigs, may be large and complex assemblies, and for example may weigh more than 8 tonnes. In the interests of weight saving, a known heat exchanger is fabricated from a series of titanium alloy panels which are manufactured in a diffusion bonding and superplastic forming process, and which are united in an assembly by joining them to upper and lower headers by heavy 15 mm thick multi-pass TIG (titanium inert gas) welds. Heat treatment of the assembly after welding can cause undesirable strain relaxation mechanisms. Stress concentration features associated with the welds can be eliminated by manual grinding, but this can cause an unacceptable loss of material leading to geometric thinning in critical locations, for example in the ligaments between adjacent panels.

It is desirable to restore the ground features back to geometrical limits. However, access to the ground regions can be very difficult for conventional metal deposition techniques. Also, since the grinding process will be bespoke for each particular feature formation, the resulting geometry after grinding is non-standard, and this can further limit access and line of sight.

U.S. Pat. No. 6,612,480 discloses the repair of metal parts by adding new metal in the form of a preform. The preform is formed by metal spraying on to a separation sheet which is subsequently separated from the preform. The preform can then be cut and shaped as appropriate and welded to the substrate metal. Such a process lacks accuracy, and, in particular, there is a possibility that voids will be formed between the substrate metal and the preform which can reduce mechanical strength and form future stress concentration features which may contribute to the generation of flaws.

According to the present invention there is provided a method of restoring a metallic component, the method comprising:
(i) removing material from a region of the component to be restored in a manner which leaves a cavity in a surface of the component;
(ii) establishing cavity profile data representing the profile of the cavity surface;
(iii) using the cavity profile data to form a first metallic repair insert having a contact surface complementary to the cavity surface;
(iv) applying the first repair insert to the component with the contact surface of the first repair insert in contact with the cavity surface; and
(v) applying heat to the first repair insert to fuse the contact surface of the first repair insert to the cavity surface.

A method in accordance with the present invention enables a repair to be conducted in a manner which has minimal effect on the metallurgy of the component, and reduces the risk of burn-through of the ligament geometry and unacceptable introduction of further gross residual stresses. These benefits are particularly relevant in the context of heat exchangers, which are pressure vessels for which any repair will require certification to the relevant Lloyds criteria. Also, a method in accordance with the present invention can eliminate any requirement for post-weld heat treatment, which is required if metal is added by way of a conventional fusion welding process utilising a filler material such as a preform.

The heat may be applied to the first repair insert by means of a laser heat source.

The heat may be applied to the first repair insert successively to spaced locations on the first repair insert so as to fuse the contact surface of the first repair insert to the cavity surface successively at the respective locations. Consecutive ones of the successively heated locations may be spaced apart from each other by not less than 1 mm, for example not less than 2 mm, in order to allow the metal at each heated location to cool after fusing at that location has occurred.

Heating at each location may cause substantial heating of only a relatively small proportion of the total volume of the first repair insert. For example, heating at each location may cause substantial heating of less than 1% of the total volume of the first repair insert. In the context of the present invention, the expression "substantial heating" means heating to a temperature close to the melting point of the material of the first repair insert. Consequently, while heating proceeds at each successively heated location, thermal effects, such as thermal stressing and deformation, is limited in the regions of the first repair insert away from the currently heated location.

The successively heated locations may be disposed on a predetermined path which is followed by the means, such as the laser, which applies the heat. The profile of the first repair insert may be monitored during the heating process, and the predetermined path may be modified as necessary to mitigate any detected distortion of the first repair insert.

In a specific method in accordance with the present invention, the heated locations overlap one another whereby, following completion of the heat application to all of the heated locations, the contact surface of the first repair insert is fused to the cavity surface over substantially the full area of the contact surface.

Following completion of the application of heat to all of the heated locations, heat may be applied to a region of the first repair insert, which region includes a plurality of the heated locations, and may include all, or substantially all, of the heated locations.

Following the fusing of the first repair insert to the cavity surface, at least one subsequent repair insert may be applied to a preceding repair insert, and heat may be applied to the subsequent repair insert to fuse the subsequent repair insert to the preceding repair insert. Thus, a plurality of repair inserts may be built up within the cavity. Heat may be applied to each subsequent repair insert in a manner as defined above, with regard to the application of heat to the first repair insert.

It may sometimes be desirable to undertake one or more physical simulation(s) to optimise the fill pattern, including the shapes of the repair inserts and the heating sequence for the successively heated locations and to validate the fill strategy for each specific geometry. Assessment and characterisation of the or each simulation may be via non-destructive or destructive means.

Following the fusing of at least one of the repair inserts to the cavity surface or to an exposed surface of a preceding repair insert, the method may comprise establishing repair insert profile data representing the profile of the exposed surface of a respective repair insert, and using the repair insert profile data to form a subsequent repair insert having a contact surface complementary to the exposed surface of the preceding repair insert. Alternatively, the contact surface of at least one of the subsequent repair inserts may be formed using a predictive modelling technique on the basis of the form of the contact surface of a preceding repair insert.

In an alternative procedure, the contact surface of a subsequent repair insert may be formed by means of a moulding process utilising a mould impression taken from the exposed surface of a preceding repair insert.

At least one of the repair inserts may be provided with a locating element which is used to locate or retain the repair insert with respect to the component or with respect to a preceding repair insert. If a plurality of the repair inserts have respective locating elements, the locating elements may be offset from one another about the peripheries of the respective repair elements.

The or each repair element may be relatively thin, for example having a thickness not greater than 0.5 mm. At least five, for example 10 or more, inserts may be applied successively as layers to fill the cavity. Once all the required layers have been applied and fused, the resulting surface of the component may be finished to a desired standard and profile by a suitable process, such as manual grinding.

For a better understanding of the present invention, and to show more clearly how it may be carried into effect, reference will now be made, by way of example, to the accompanying drawings, in which:

FIG. 1 shows a heat exchanger;

FIG. 2 is an enlarged view of the region II in FIG. 1;

Figure 4:
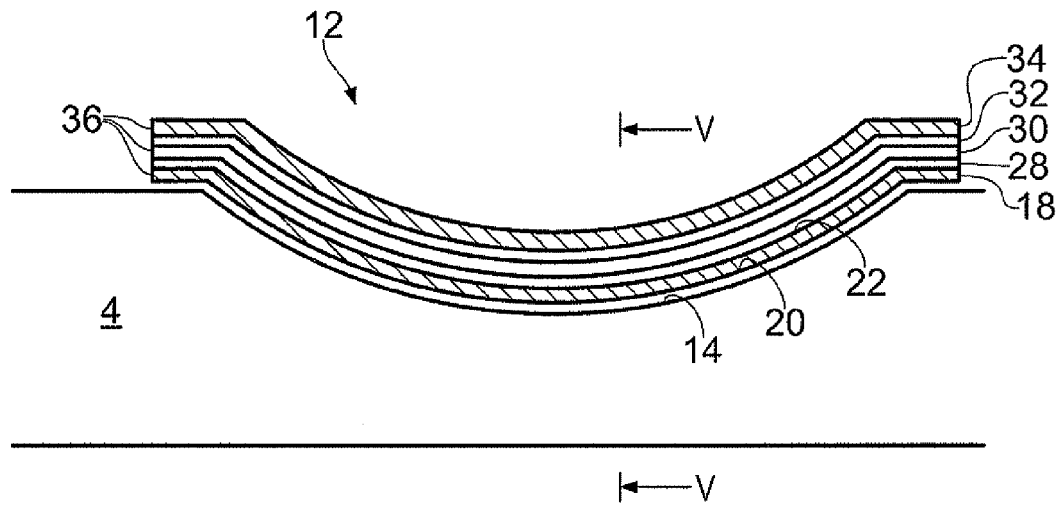
Figure 5:
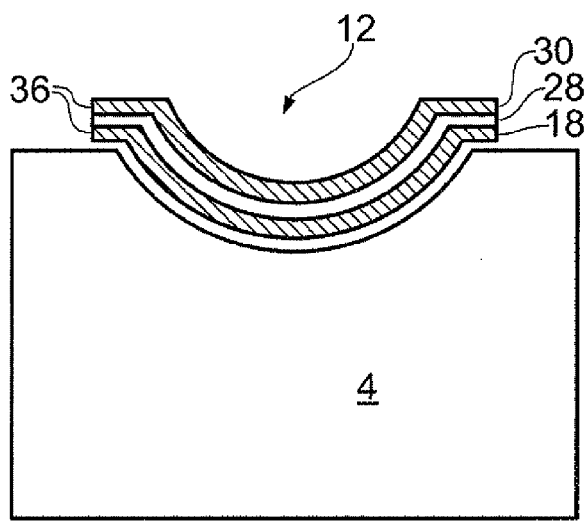
Figure 6:
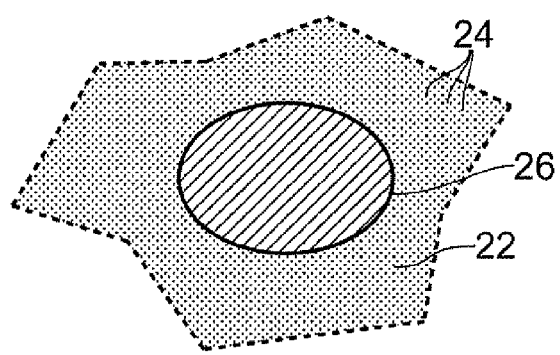
Figure 7:
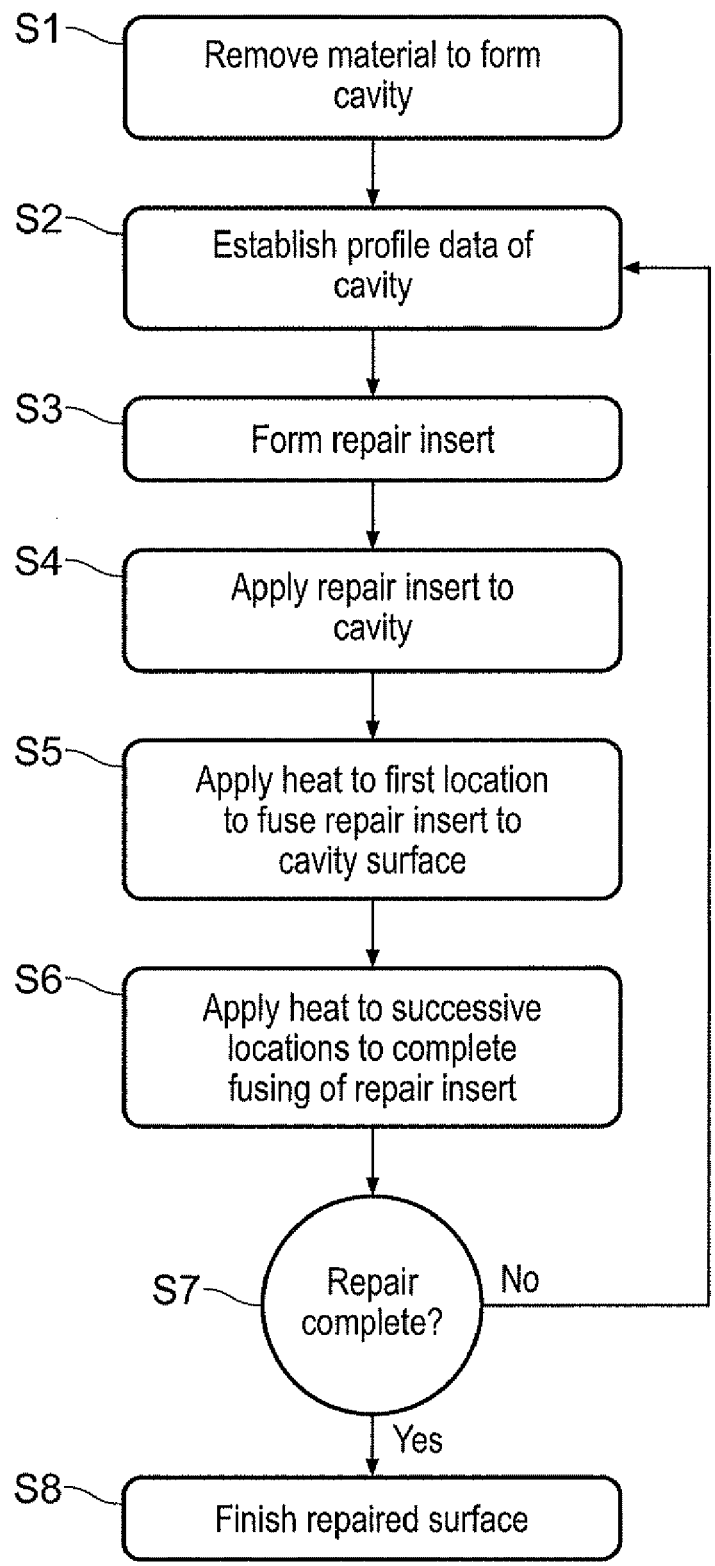

FIG. 3 schematically represents a repair to the heat exchanger of FIGS. 1 and 2;

FIG. 4 is a schematic sectional view representing another form of repair;

FIG. 5 is a sectional view on the line V-V in FIG. 4;

FIG. 6 is a schematic representation of a fusing process in the repairs shown in FIGS. 3 to 5; and FIG. 7 is a flowchart representing the repair process.

The heat exchanger shown in FIGS. 1 and 2 comprises upper and lower headers 2, 4 and hollow panels 6. The panels 6 are formed from titanium alloy by a diffusion bonding and superplastic forming process. The panels 6 are welded at their ends to the headers 2, 4 by 15 mm thick multi-pass TIG welds 8. As indicated in FIG. 2, adaptive restoration may be beneficial in the region 10 of the headers 2, 4 between adjacent panels 6, and particularly in the welds 8. Restorative work in such regions is conducted as follows.

As a first step S1 (FIG. 7), the location can be processed by manual grinding which removes material to create a recess 12 in the respective header 2, 4 (FIG. 3). In FIGS. 3 to 5, the resulting cavity 12 is shown in the lower header 4, but it will be appreciated that the treatment may also be applied to the upper header 2.

In FIG. 3, the cavity 12 is shown as having a rectangular cross-section with a flat base 14 and vertical side walls 16. However, the profile of the cavity 12 shown in FIG. 3 is schematic only and, although the general form is shown it will be appreciated that the exact profile of the recess 12 will vary from case to case in dependence on the condition of the part and the service running experience. Thus, for example, the walls 16 may vary from the vertical, the path of the cavity 12 along the header 4 may not be straight, and the depth of the cavity 12 may vary along its length. Thus, the cavity 12 is a non-planar, complex 3D feature.

In step S2 of the process, the profile of the cavity 12 is determined by any suitable process, such as photogrammetry or laser scanning, which provides cavity profile data which, in step S3, is supplied to suitable equipment for forming a first repair insert 18. For example, the cavity profile data may be input to a CAD-CAM equipment coupled to a stereo lithographic process. A suitable machine for this purpose is an Electron Beam Melting machine available from Arcam AB of Mölndal, Sweden, which uses a powder bed configuration.

The repair insert 18 is formed by partial or full consolidation of the alloy powder to the input geometric definition, including the cavity profile data acquired at step S2. Consequently, the repair insert 18 is able to conform substantially precisely to the unique contour of the manually ground cavity 12.

The powder for the powder bed process may be manufactured in any suitable way, for example by gas atomisation or by a plasma rotating electrode process (PREP).

The exposed surface 22 may be generally smooth, but could be provided with dimples or projections (pylons) to control heat flow as will be described below.

Thus, in step S3, the first repair insert 18 is produced in the form of a layer having thickness in the range 350 to 500 microns. The repair insert 18 has the same alloy composition as the substrate material of the header 4, which may be a titanium alloy (alpha/beta, near alpha, CP etc) or a steel or nickel alloy. Such materials are suitable for use in heat exchangers exposed to a stress corrosion cracking environment, such as an offshore oil installation. If desired, the composition of the powder can be adjusted or graded in order to control the mechanical properties.

It will be appreciated that the first repair insert 18 will have a contact surface 20 and an opposite surface 22 which is initially exposed. The contact surface 20 has a profile which is substantially complementary to the profile of the base 14 of the cavity 12, and a periphery which conforms to the side walls 16. In step S4, the first repair insert 18 is placed in the cavity 12 in contact with the base 14.

Once the repair insert 18 is installed in the cavity 12, it is fused in step S5 to the substrate material of the header 4 by means of a laser heat source which may, for example, be a fibre laser source and optic with a power output controllable from 200 to 1 kW and having a 1 to 2 mm spot size, giving an energy density in the region 250 to 0.3 kW/mm. The laser source preferably has pulse, high/low and on/off controls. In step S6, the laser source rasters across the exposed surface of the repair insert 18 according to a predetermined path, successively applying heat to spaced locations on the repair insert 18, as indicated schematically in FIG. 6, which represents the exposed surface of the repair insert 18. The dots 24 in FIG. 6 represent spaced locations which are heated successively in turn by the laser heat source with the laser output in a very focussed state. Thus, each heated location receives enough laser energy to fuse the contact surface 20 to the base 14 of the cavity 12, while the surrounding region of the repair insert 18 is heated only minimally, if at all. The fusing process of step S5 thus provides a series of heating and melting events to tack the repair insert 18 into position and to fuse the repair insert 18 to the underlying material such that temperature is balanced across the component. The sequence of heated locations 24, and the path followed by the laser source are bespoke to the particular shape, size and thickness of the repair insert 18 and established to ensure that only very small volumes of the repair insert 18 are heated at a time, in order to avoid the generation of residual stresses in the repair insert 18. For example, successive consecutive heated locations (dots 24) are preferably spaced apart by more than 1 mm, for example by 2 to 3 mm to ensure that heat is dissipated from each heated location 24 after fusing at that location has occurred. The sequence of heated locations 24 may be disposed in a checkerboard pattern, so that each heated location is separated from the immediately preceding heated location 24 by at least one "square" of the checkerboard. It will be appreciated that the array of heated locations 24 need not be a checkerboard array, not need the individual heated locations 24 be square. For example, the heated locations 24 may constitute a series of polygons of near equi-spaced nodes.

In some circumstances, it may be possible for multiple heat sources or a beam splitter to be employed to achieve simultaneous heating of more than one heated location at a time although, again, simultaneously heated locations 24 are preferably spaced apart from each other.

The volume of the repair insert 18 heated at each heating location is small in relation to the overall volume of the repair insert 18, and may, for example, be not more than 1% of the overall volume.

The repair insert 18 may be monitored during the heating process, for example, by means of an in-situ camera, possibly in conjunction with illumination of the exposed surface 22 by patterned side lighting (e.g. use of a diffraction pattern which is formed via a stereo observation system with the capability to maintain one or more positions of illumination and detection) to enable visualisation or calculation of the surface profile of the exposed surface 22. The patterned lighting may be provided by means of an LED array using existing camera technology (e.g. green light LEDs may be a preferred option due to its higher resolution). Such measures would identify any lifting, wrinkling or curling of the repair insert 18 as the heating process proceeds, to enable corrective action, for example in terms of the energy of the laser pulse at each heated location 24, or in the predetermined path followed by the laser source, or by the sequence of heated locations 24 to be exposed to a laser pulse. In the case of insert lifting, the pulse position and repetition response is controlled to standardised and pre-programmed responses in an automated expert system. Thus, for example, if any part of the repair insert 18 appears to be lifting from the base 14, the laser heat source could be diverted from the previously predetermined path to apply pulses to one or more of the locations 24 in the lifting region in order to fuse that region to the base 14 to prevent further lifting.

The grain structure of the repair insert 18 can be controlled to some extent by the heating process. For example, grain growth tends to occur normal to the solidification front of the molten material, and consequently control of the size and duration of the pulses at the heated locations 24 can influence of the shape of the molten region. For example a shallow molten region in a horizontal substrate surface will have a substantial generally horizontal solidification front, causing grains to grow vertically, and so be elongate or close to the vertical direction. A relatively deep melt pool with have upwardly extending sides, in which grain growth will occur generally laterally. Thus, the grain epitaxy can be controlled to impart desired properties to the repair insert 18.

The heating process is continued until all of the heated locations 24 have been fused to the surface of the cavity 12. Although the heated locations 24 are represented in FIG. 6 by small dots they will, in practice, overlap one another so that, once fusing has occurred at all of the heated locations 24, the contact surface 20 will be fused over substantially its entire area to the surface of the cavity 12. Subsequently, a second, defocused laser pass may be deployed to provide localised stress relieving heat treatment. For example, the defocused laser pass may cause heating of a region 26 which embraces many of the heated locations 24. A single defocused spot, or a raster pattern, may be selected to target only part of the exposed surface 22, as shown in FIG. 6, or may cover the entire exposed surface 22, or may embrace also a surrounding halo extending over the surface of the substrate material of the header 4. Although this stress relieving heating operation may be performed using the same laser as the heating of the heated locations 24, other heat sources may be employed such as electron beam welding, convection heating, etc. A key aim of the secondary heating process is to provide a controlled heat treatment which results in minimised residual stress.

As mentioned above, the exposed surface of the repair insert 18 may be provided with dimples or pylons to facilitate heat flow into the substrate of the material surrounding the cavity 12, and in order to provide reinforcement to the repair insert 18 so as to avoid buckling or wrinkling. If the repair insert 18 is made by a stereolithographic process, the pylons may be a remnant feature of the support structure required in the insert's additive manufacturing process. Other techniques for achieving a compressive residual stress in the repair insert 18 may be used, such as burnishing, laser shock peening or impact peening. Also, a manual or automatic dressing operation may be performed on the repair insert 18, or a glazing surface wash may be performed in which the exposed surface 22 of the repair insert is heated to perform a shallow remelting operation.

As indicated at S7, steps S2 to S6 are repeated for subsequent repair inserts 18. Thus, following completion of the fusing operation of the first repair insert 18, a subsequent repair insert 28 is formed. The contact surface of the subsequent repair insert 28 may be formed in the same manner as described above for the first repair insert 18, for example by establishing the profile of the exposed surface 22 and using the resulting profile data to form the required profile in an Arcam type powder bed process. As indicated in FIG. 3, successive layers of repair inserts 30, 32 and 34 are laid up in the cavity 12 until the cavity 12 is filled to the desired extent. The final level of repair inserts 18, 28 to 34 may be below, level with, or above the surrounding substrate surface of the header 4, and the final layer 34 (in FIG. 3) may be subjected to suitable dressing, stress relieving or surface glazing operations as referred to above in connection with the first repair insert 18. Localised etching may be employed on the exposed surface of the final repair insert 34, or any of the individual repair inserts 18, 28 to 34 in order to undertake local fluorescent penetrant inspection (FPI).

Each subsequent repair insert 28 to 34 is fused to the repair insert immediately below it in the same manner as described above with reference to the first repair insert 18. The fusing of each layer to the one beneath it may also result in remelting of previous layers, which reduces the risk of gross porosity within the layered structure. It is desirable for all of the fusing operations, including the period while there is residual heat in the substrate or in the layers, to occur in an inert environment, for example within a gas shield of argon or helium. The pattern of the fusion pulse fill sequence is specifically determined to prevent undesirable gas encapsulation.

FIGS. 4 and 5 shown an alternative configuration of the cavity 12 in which, instead of being of generally rectangular profile, the cavity 12 has a curved profile, both in the longitudinal direction (as visible in FIG. 4) and the transverse direction (as visible in FIG. 5). The repair inserts 18 and 28 to 34 are formed and built up as described above with reference to FIG. 3, although it will be appreciated that the subsequent repair inserts 28, 30, 32 will need to be reduced successively in size in order to conform to the exposed surface 22 of the immediately preceding repair insert.

Also, shown in FIGS. 4 and 5 are locating elements in the form of tabs 36 on each of the repair inserts 18, 28 to 34. Although visible on both sides and at both ends of each repair insert, the tabs 36 may instead be disposed at only one or a few locations around the periphery of each repair insert. The tabs 36 are provided to locate the respective repair insert with respect to the cavity 12 and may also be used clamp the respective repair inserts in position for the fusing operations, bearing in mind that, in some circumstances, the cavity 12 will open laterally or downwards. The tabs 36 of successive repair inserts 18, 28 to 34 may be offset with respect to one another around the periphery of the layered stack of repair inserts so they do not interfere with one another, instead of the overlapping arrangement shown in FIGS. 4 and 5. Following completion of the stack of repair inserts, the locating tabs 36 may be removed in a suitable machining operation, for example by manual grinding, which may also serve as a final finishing operation on the repaired surface, indicated as step 8 in FIG. 7.

Although FIG. 3 shows a stack of repair inserts 18, 28 to 34 which are formed at their peripheries to contact the vertical sides 16 of the cavity 12, at least some of the repair inserts may be formed so as to have a portion which extends upwardly from the base 14 over the sides 16. Thus, for example, the first repair insert 18 may have a portion corresponding to the repair insert 18 shown in FIG. 3 and extending over the base 14, a pair of side portions extending over the side walls 16 of the cavity 12, and one or more tabs extending over the surface of the header 4 to assist in locating and retaining the repair insert. The tab may act as a datum location feature for the proceeding layer(s) formed by the repair inserts 18 and may also act as a holding feature during tacking, in order to maintain alignment and position.

Although the shapes of the subsequent repair inserts 28 to 34 and in particular the profiles of their contact surfaces 20, may be formed as described above by measurement of the exposed surface 22 of the repair insert to which they will be applied, other methods may be employed. For example, a moulding composition may be pressed into the cavity 12 to take an impression of the exposed surface 22 of the preceding repair insert, which impression can be used to form a mould in which the subsequent repair insert is formed. Sometimes, it is possible to predict relatively accurately what the profile of the exposed surface 22 of at least one of the repair inserts 18 will be, an in such circumstances the form of the contact surface of the next succeeding repair insert may be determined by predictive modelling.

The individual repair inserts 18, 28 to 34 may be installed in the cavity 12 by any suitable means, for example by manual or automatic manipulation, possibly using or holding the locating tabs 26 to support the repair inserts during installation and to ensure their correct alignment.

In some circumstances, for example, where the restoration is required as a result of wear of the component (such as the heat exchanger shown in FIGS. 1 and 2) rather than unique component specific features, the cavity 12 may be formed to a known profile, in which case the repair inserts 18, 28 to 34 may be produced in advance with at least the first repair insert 18 formed with a contact surface 20 derived from a standard model cavity 12, rather than directly from the cavity 12 actually formed in the component.

A method as described above enables a fully adaptive custom-fit restoration process to be developed to suit the particular target recessed geometry occurring in a component, as opposed to the original geometry, is part of the restoration process. The method enables the original geometry prior to the creation of the recess to be restored, to tight tolerances, without excessive accumulation of heat between the pulses on a large volumetric scale, which can result in undesirable distortion of the substrate material. The repair process can especially be conducted when access is restricted.

The repair inserts may be made from the same or different alloy as the substrate material.

Use of the method may avoid requirement for post-weld heat treatment and avoids gross porosity in the repaired region, and avoids significant heat affected zones of the repair inserts or of the underlying substrate.

The invention claimed is:

1. A method of restoring a metallic component, the method comprising:
   (i) removing material from a region of the component to be restored in a manner which leaves a cavity in a surface of the component;
   (ii) establishing cavity profile data representing the profile of the cavity surface;
   (iii) using the cavity profile data to form a first metallic repair insert having a contact surface complementary to the cavity surface and a locating element on a periphery of the first metallic repair insert to locate the first metallic repair insert in position for subsequent fusing operations;
   (iv) applying the first metallic repair insert to the component with the contact surface of the first metallic repair insert in contact with the cavity surface;
   (v) applying heat to the first metallic repair insert to fuse the contact surface of the first metallic repair insert to the cavity surface; wherein in step (v), the heat is applied to the first metallic repair insert successively at a first set of spaced locations on the first repair insert so as to fuse the contact surface of the first metallic repair insert to the cavity surface successively at the respective locations;
   (vi) further applying heat to the first metallic repair insert successively at a second set of spaced locations overlapping with the formed by respective gaps among the first set of spaced locations heated in step (v), wherein there is a heating overlap between the first set of spaced locations and the second set of spaced locations; wherein the heat applied at both the first set and the second set of spaced locations penetrates through the first metallic repair insert and affects the metallic component in order to fuse the first metallic repair insert and the metallic component; and
   (vii) following the fusing of the first metallic repair insert to the cavity surface, at least one subsequent repair insert is applied to a preceding repair insert, the subsequent repair insert having a contact surface complementary to the exposed surface of the preceding repair insert and a locating element on a periphery of the subsequent repair insert to locate the subsequent repair insert in position for fusing, and heat is applied to the subsequent repair insert to fuse the subsequent repair insert to the preceding repair insert.

2. A method as claimed in claim 1, in which heat is applied to the first repair insert by means of a laser.

3. A method as claimed in claim 1, in which consecutive ones of the successively heated locations are spaced apart from each other by not less than 1 mm.

4. A method as claimed in claim 3, in which consecutive ones of the successively heated locations are spaced apart from each other by not less than 2 mm.

5. A method as claimed in claim 1, in which the successively heated locations are disposed on a predetermined path.

6. A method as claimed in claim 5, in which the profile of the first repair insert is monitored during the heating process, and the predetermined path is modified as necessary to mitigate any detected distortion of the first repair insert.

7. A method as claimed in claim 1, in which, following completion of the application of heat to all of the heated locations, heat is applied to a region of the first repair insert, which region includes a plurality of the heated locations.

8. A method as claimed in claim 1, in which heat is applied to each subsequent repair insert by a laser.

9. A method as claimed in claim 1, in which, following the fusing of at least one of the repair inserts to the cavity surface or to an exposed surface of a preceding repair insert, the method comprises establishing repair insert profile data representing the profile of the exposed surface of a respective repair insert, and using the repair insert profile data to form a subsequent repair insert having a contact surface complementary to the exposed surface of the preceding repair insert.

10. A method as claimed in claim 1, in which the cavity profile data or the repair insert profile data used for forming the repair insert or at least one of the repair inserts is established by means of a moulding process on the cavity or on the preceding repair insert to provide dimensional information.

11. A method as claimed in claim 1, in which at least one of the repair inserts is provided with a locating element which is used to locate or retain the respective repair insert with respect to the component or with respect to a preceding repair insert.

12. A method as claimed in claim 11, in which a plurality of the repair inserts have respective locating elements, the locating elements being offset from one another about the peripheries of the respective repair inserts.

13. A method as claimed in claim 1, in which each repair insert has a thickness not greater than 0.5 mm.

* * * * *